United States Patent
Babaei et al.

(10) Patent No.: US 10,856,327 B2
(45) Date of Patent: Dec. 1, 2020

(54) ENERGY DETECTION THRESHOLD IN A WIRELESS DEVICE AND WIRELESS NETWORK

(71) Applicant: Ofinno Technologies, LLC, Herndon, VA (US)

(72) Inventors: Alireza Babaei, Ashburn, VA (US); Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 15/457,304

(22) Filed: Mar. 13, 2017

(65) Prior Publication Data
US 2017/0273109 A1    Sep. 21, 2017

Related U.S. Application Data

(60) Provisional application No. 62/308,406, filed on Mar. 15, 2016.

(51) Int. Cl.
| | |
|---|---|
| *H04W 74/08* | (2009.01) |
| *H04W 72/12* | (2009.01) |
| *H04W 72/14* | (2009.01) |
| *H04W 72/04* | (2009.01) |

(52) U.S. Cl.
CPC ... *H04W 74/0808* (2013.01); *H04W 72/0446* (2013.01); *H04W 72/1205* (2013.01); *H04W 72/1268* (2013.01); *H04W 72/14* (2013.01)

(58) Field of Classification Search
CPC .................... H04W 4/08087; H04W 74/08087
USPC ........................................................ 370/329
See application file for complete search history.

(56) References Cited

U.S. PATENT DOCUMENTS

| | | | | |
|---|---|---|---|---|
| 2009/0264088 | A1* | 10/2009 | Li et al. | H04B 1/1027 455/114.2 |
| 2012/0087334 | A1* | 4/2012 | Suzuki | H04L 5/001 370/329 |
| 2017/0118771 | A1* | 4/2017 | Kazmi | H04W 74/0808 |
| 2018/0048498 | A1* | 2/2018 | Stern-Berkowitz | H04W 16/14 |
| 2018/0242364 | A1* | 8/2018 | Park | H04W 88/08 |
| 2018/0279365 | A1* | 9/2018 | Wang | H04W 52/367 |

OTHER PUBLICATIONS (3GPP TSG RAN WG1 Meeting #83 Anaheim, USA, Nov. 15-22, 2015).*
(3GPP TSG RAN WG1 #82; Beijing, China, Aug. 24-28, 2015; Agenda item: 7.2.4.1; Source: Samsung;Title: CCA threshold and transmission power for LAA; R1-154139) (Year: 2015).*

(Continued)

*Primary Examiner* — Kodzovi Acolatse
*Assistant Examiner* — Abdeltif Ajid
(74) *Attorney, Agent, or Firm* — David Grossman; Kavon Nasabzadeh; Philip Smith

(57) ABSTRACT

A wireless device receives one or more downlink control information (DCI) comprising transmission parameters for a plurality of signals and one or more power control commands. The wireless device calculates a transmission power of each of the plurality of signals employing the one or more power control commands. The wireless device calculates an energy detection threshold based, at least in part, on the transmission power of the plurality of signals. The wireless device performs a listen before talk (LBT) procedure employing the energy detection threshold.

20 Claims, 15 Drawing Sheets

(56) References Cited

OTHER PUBLICATIONS

R1-157172, 3GPP TSG RAN WG1 Meeting #83, Anaheim, USA, Nov. 15-22, 2015, Agenda Item: 6.2.3.1, Source: Intel Corporation, Title: On the LAA ED threshold.
R1-157255, 3GPP TSG RAN WG1 Meeting #83, Anaheim, USA, Nov. 16-22, 2015, Source: Ericsson, Title: On Energy Detection Threshold for LAA.
R1-157258, 3GPP TSG RAN WG1 Meeting #83, Anaheim, USA, Nov. 16-20, 2015, Source: Ericsson, Title: On Channel Access Solutions for LAA Multi-Carrier Transmission.
R1-160566, 3GPP TSG RAN WG1 Meeting #84, St Julian's, Malta, Feb. 15-19, 2016, Agenda item: 7.3.1.5, Source: Samsung, Title: Discussion on Cat 4 based UL LBT.
R1-160567, 3GPP TSG RAN WG1 #84 , St Julian's, Malta, Feb. 15-19, 2016, Source: Samsung, Title: Performance Evaluation of UL LBT.
R1-161029, 3GPP TSG RAN WG1 meeting #84, St Julian's, Malta, Feb. 15-19, 2016, Agenda Item: 7.3.1.5, Source: ITL, Title: UL LBT design in Rel-14 eLAA.
R1-154139, 3GPP TSG RAN WG1 #82, Beijing, China, Aug. 24-28, 2015, Source: Samsung, Title: CCA threshold and transmission power for LAA.
R1-155096, 3GPP TSG RAN WG1 82bis Meeting, Malmo, Sweden, Oct. 5-9, 2015, Source: Huawei, HiSilicon, Title: Evaluations for energy detection threshold.
R1-155097, 3GPP TSG RAN WG1 82bis Meeting, R1-155097, Malmo, Sweden, Oct. 5-9, 2015, Agenda Item: 7.2.3.1, Source: Huawei, HiSilicon, Title: Adaptation rules of energy detection threshold.
R1-155310, 3GPP TSG RAN WG1 Meeting #82bis, Malmö, Sweden, Oct. 5-9, 2015, Agenda Item: 7.2.3.1, Source: Intel Corporation, Title: Energy detection threshold for LAA.
R1-155385, 3GPP TSG RAN WG1 meeting #82bis, Malmö, Sweden, Oct. 5-9, 2015, Agenda Item: 7.2.3.1, Source: LG Electronics, Title: Energy detection threshold in LAA.
R1-155460, 3GPP TSG RAN WG1 #82bis, Malmö, Sweden, Oct 5-9, 2015, Agenda item: 7.2.3.1, Source: Samsung, Title: LAA energy detection adaptation.
R1-155592, 3GPP TSG RAN WG1 Meeting #82bis, Malmö, Sweden, Oct. 5-9, 2015, Agenda item: 7.2.3.1, Source: HTC, Title: Discussion on Adaptation Rules of the Maximum Energy Detection Threshold in LAA Coexistence.
R1-155721, 3GPP TSG RAN WG1 #82bis, Oct. 5-9, 2015, Malmo, Sweden, Agenda item:7.2.3.1, Source: Qualcomm Incorporated, Title: Adaptive ED threshold setting.
R1-155914, 3GPP TSG-RAN WG1 #82BIS, Malmö, Sweden, Oct. 5-9, 2015, Agenda item: 7.2.3.1, Source: Institute for Information Industry (III), Title: Considerations on Energy Detection Threshold Adaptation.
R1-156037, 3GPP TSG RAN WG1 Meeting #82bis, Malmö, Sweden, Oct. 5-9, 2015, Source: Ericsson, Title: On Adaptation of the Energy Detection Threshold for LAA.
R1-156437, 3GPP TSG RAN WG1 83 Meeting, Anaheim, USA, Nov. 15-22, 2015, Agenda Item: 6.2.3.1, Source: Huawei, HiSilicon, Title: Adaptation rules of energy detection threshold.
R1-156489, 3GPP TSG RAN WG1 #83, Nov. 15-22, 2015, Anaheim, USA, Agenda item: 6.2.3.1, Source: Cisco Systems, Title: Views on Energy Detection Threshold Adaptation.
R1-156510, 3GPP TSG RAN WG1 Meeting #83, Anaheim, USA, Nov. 15-22, 2015, Source: Intel Corporation, Title: Remaining Details on LBT.
R1-156574, 3GPP TSG RAN WG1 Meeting #83, Anaheim, USA, Nov. 15-22, 2015, Source: CATT, Title: Remaining details of DL LBT for LAA.
R1-156702, 3GPP TSG RAN WG1 Meeting 83, Anaheim, USA, Nov. 16-20, 2015, Source: Sony, Title: LAA energy detection adaptation rules.
R1-156762, 3GPP TSG RAN WG1 Meeting #83, Anaheim, USA, Nov. 15-22, 2015, Source: Samsung, Title: ED threshold adaptation for LAA.
R1-156914, 3GPP TSG RAN WG1 83 Meeting, Anaheim, USA, Nov. 15-22, 2015, Agenda Item: 6.2.3.1, Source: Huawei, HiSilicon, Title: Remaining LBT parameters for LAA DL.
R1-157036, 3GPP TSG RAN WG1 #83, Nov. 14-22, 2015, Anaheim, USA, Source: Qualcomm Incorporated, Title: Adaptive ED threshold setting.
R1-157281, 3GPP TSG RAN WG1 Meeting #83, Anaheim, USA, Nov. 15-22, 2015, Agenda item: 6.2.3.1, Source: HTC, Title: Discussion on Adaptation Rules of the Maximum Energy Detection Threshold in LAA Coexistence.
R1-157531, 93GPP TSG RAN WG1 Meeting #83, Anaheim, USA, Nov. 16-20, 2015, Source: Ericsson, Title: On Energy Detection Threshold for LAA.
R1-160339, 3GPP TSG RAN WG1 Meeting #84, St Julian's, Malta, Feb. 15-19, 2016, Source: ZTE, Title: TPC for UL LAA.
R1-160424, 3GPP TSG RAN WG1 Meeting #84, St. Julian's, Malta, Feb. 15-19, 2016, Source: Intel Corporation, Title: On the remaining details for UL LBT.
R1-160570, 3GPP TSG RAN WG1 Meeting #84, St Julian's, Malta, Feb. 15-19, 2016, Source: Samsung, Title: Discussion on enhanced Cat 2-based UL LBT.
R1-160630, 3GPP TSG RAN WG1 meeting #84, St Julian's, Malta, Feb. 15-16, 2016, Source: LG Electronics, Title: LBT schemes in LAA UL.
R1-160674, 3GPP TSG RAN WG1 Meeting #84, St Julian's, Malta, Feb. 15-19, 2016, Source: Sony Corporation, Title: UL Channel access mechanism design in eLAA.
R1-160741, 3GPP TSG RAN WG1 84 Meeting, St Julian's, Malta, Feb. 15-19, 2016, Source: Huawei, HiSilicon, Title: Other issues related to LBT for eLAA.
R1-160914, 3GPP TSG RAN WG1 Meeting #84, St. Julian's, Malta, Feb. 15-19, 2016, Title: Channel Access for the Support of LAA UL, Source: Nokia Networks, Alcatel-Lucent, Alcatel-Lucent Shanghai Bell.
R1-161001, 3GPP TSG RAN WG1 Meeting #84, St. Julian's, Malta, Feb. 15-19, 2016, Source: Ericsson, Title: On UL Channel Access Procedures for Enhanced LAA.
3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).
3GPP TS 36.211 V13.0.0 (Dec. 2015), Technical Specification, 3rd Generation Partnership Project; Technical Specification Group Radio Access Network; Evolved Universal Terrestrial Radio Access (E-UTRA);Physical channels and modulation, (Release 13).
3GPP TS 36.212 V13.0.0 (Dec. 2015), Technical Specification, 3rd Generation Partnership Project; Technical Specification Group Radio Access Network; Evolved Universal Terrestrial Radio Access (E-UTRA);Multiplexing and channel coding, (Release 13).
3GPP TS 36.213 V13.0.1 (Jan. 2016), Release 13, Technical Specification (TS).
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).
3GPP TS 36.321 V13.0.0 (Dec. 2015), Technical Specification, 3rd Generation Partnership Project; Technical Specification Group Radio Access Network; Evolved Universal Terrestrial Radio Access (E-UTRA);Medium Access Control (MAC) protocol specification, (Release 13).
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA);Radio Resource Control (RRC); Protocol specification (Release 13).

\* cited by examiner

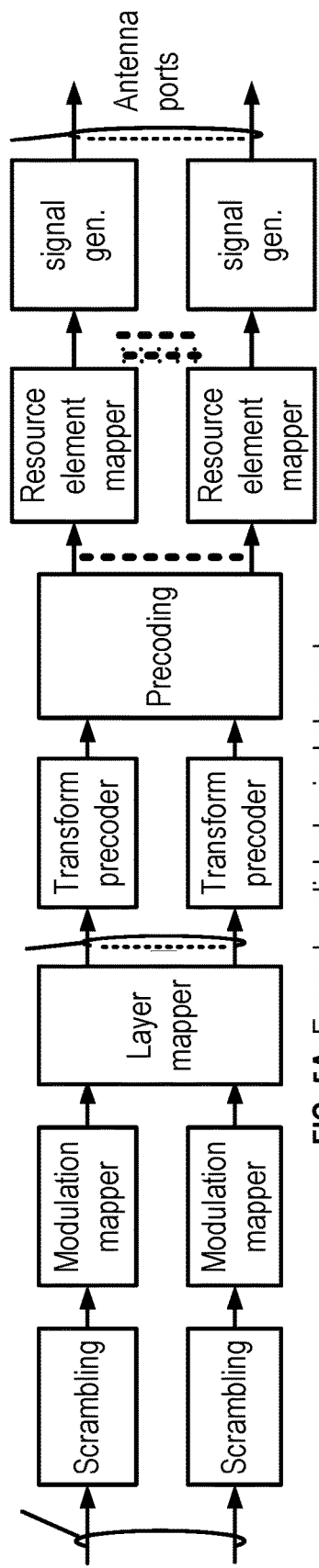
FIG. 5A Example uplink physical channel
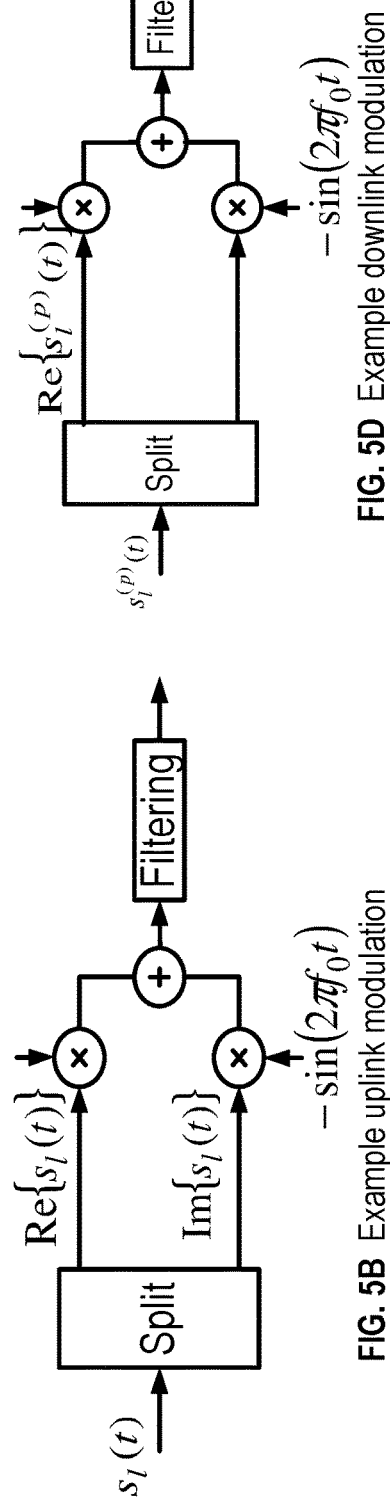
FIG. 5B Example uplink modulation
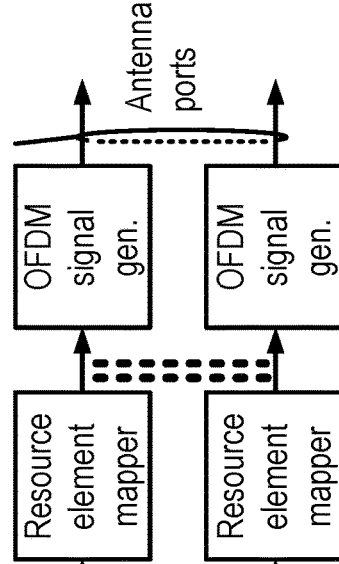
FIG. 5D Example downlink modulation
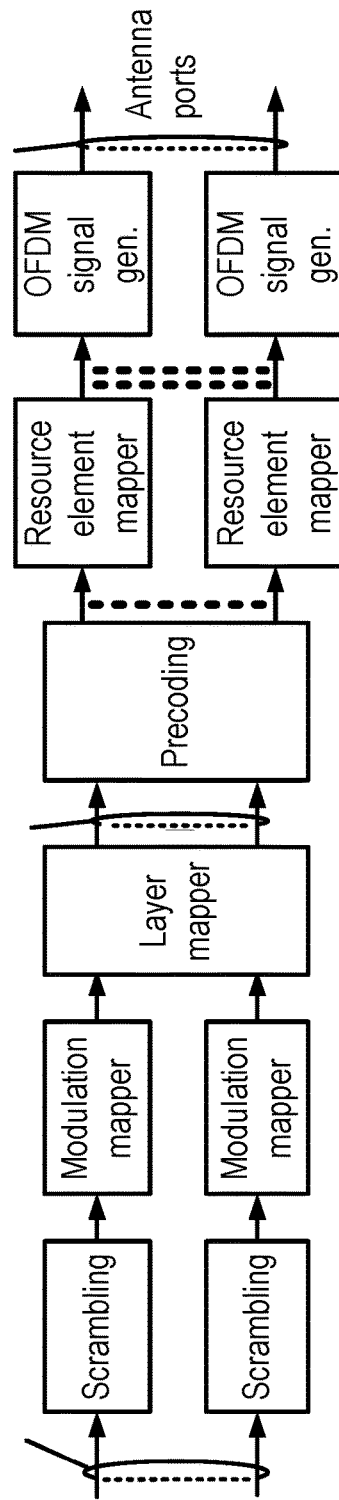
FIG. 5C Example downlink physical channel Dual-Connectivity at eNB Dual-Connectivity- two MAC entities at UE side

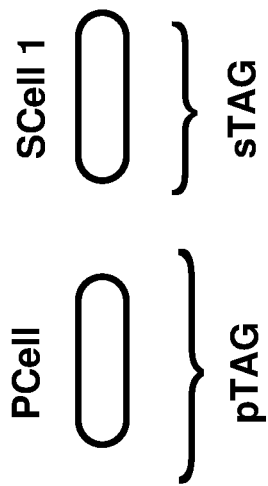
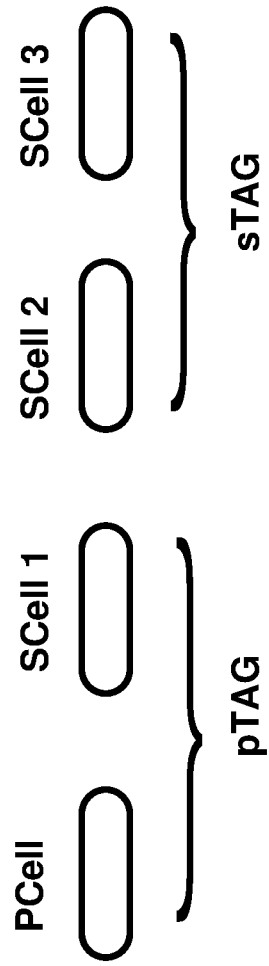
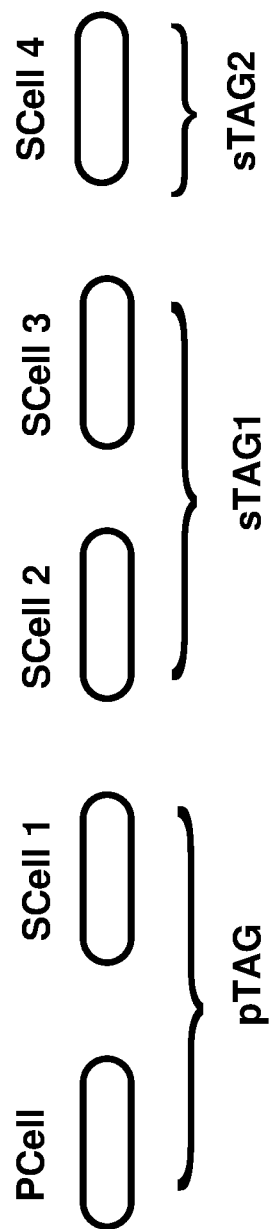
FIG. 8

ENERGY DETECTION THRESHOLD IN A WIRELESS DEVICE AND WIRELESS NETWORK

CROSS-REFERENCE TO RELATED APPLICATIONS

This application claims the benefit of U.S. Provisional Application No. 62/308,406, filed Mar. 15, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
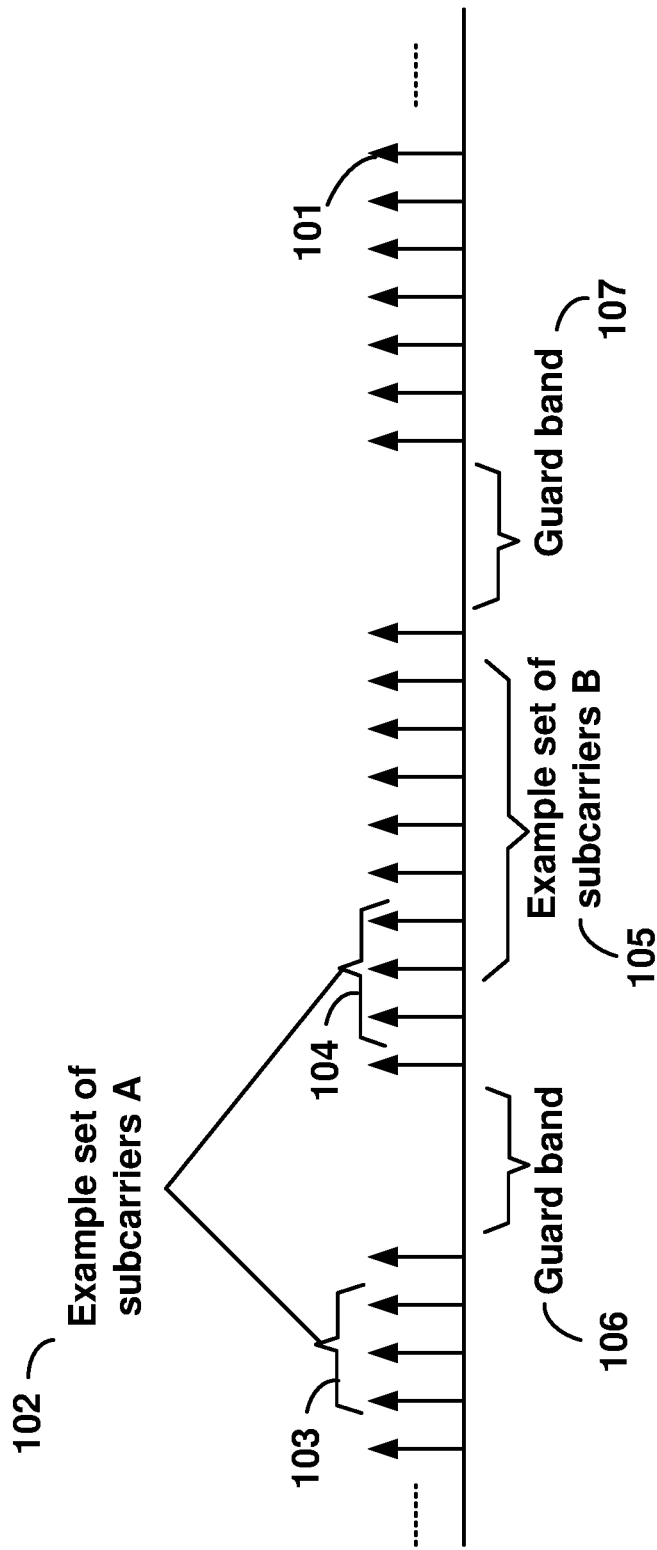
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
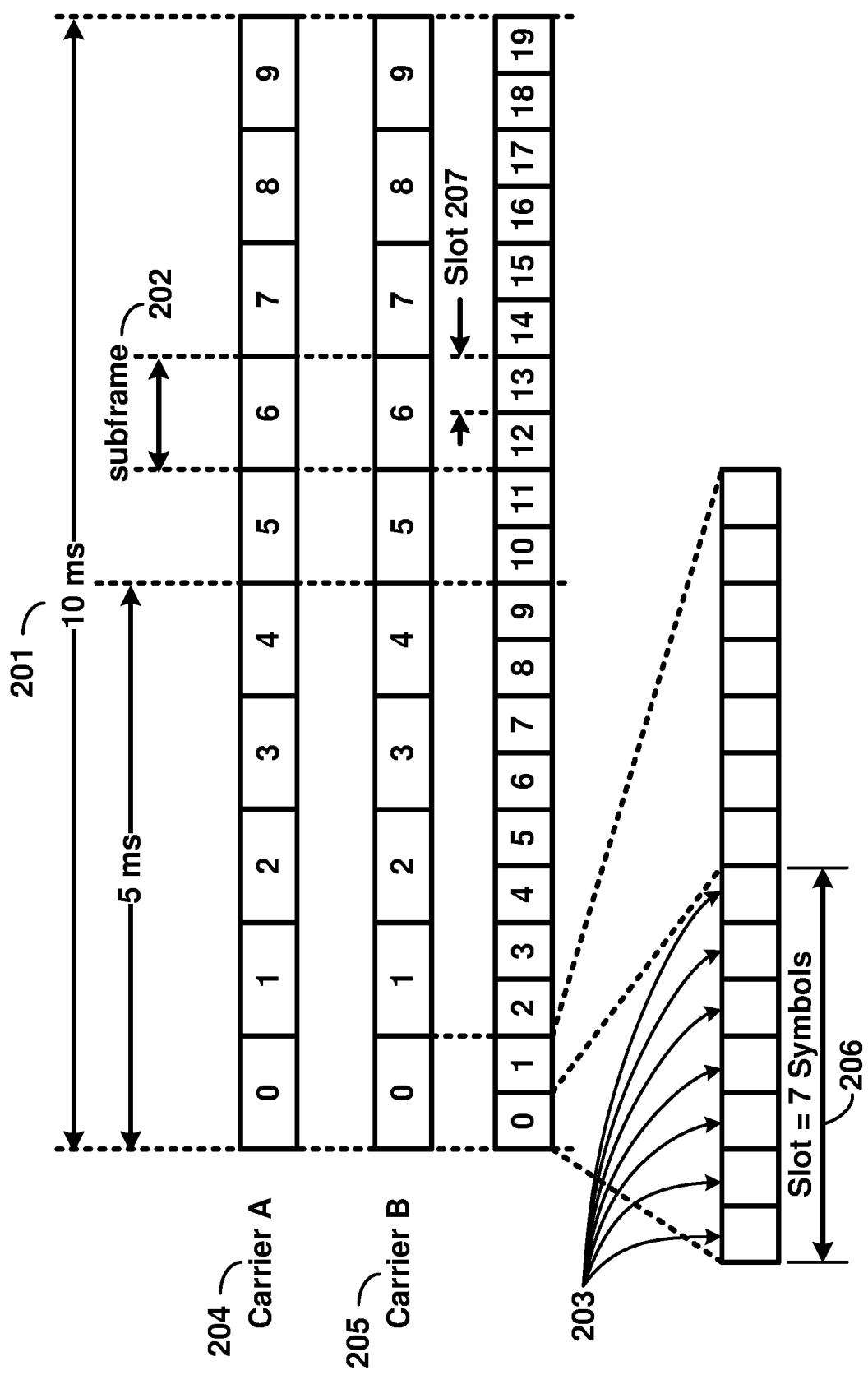
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
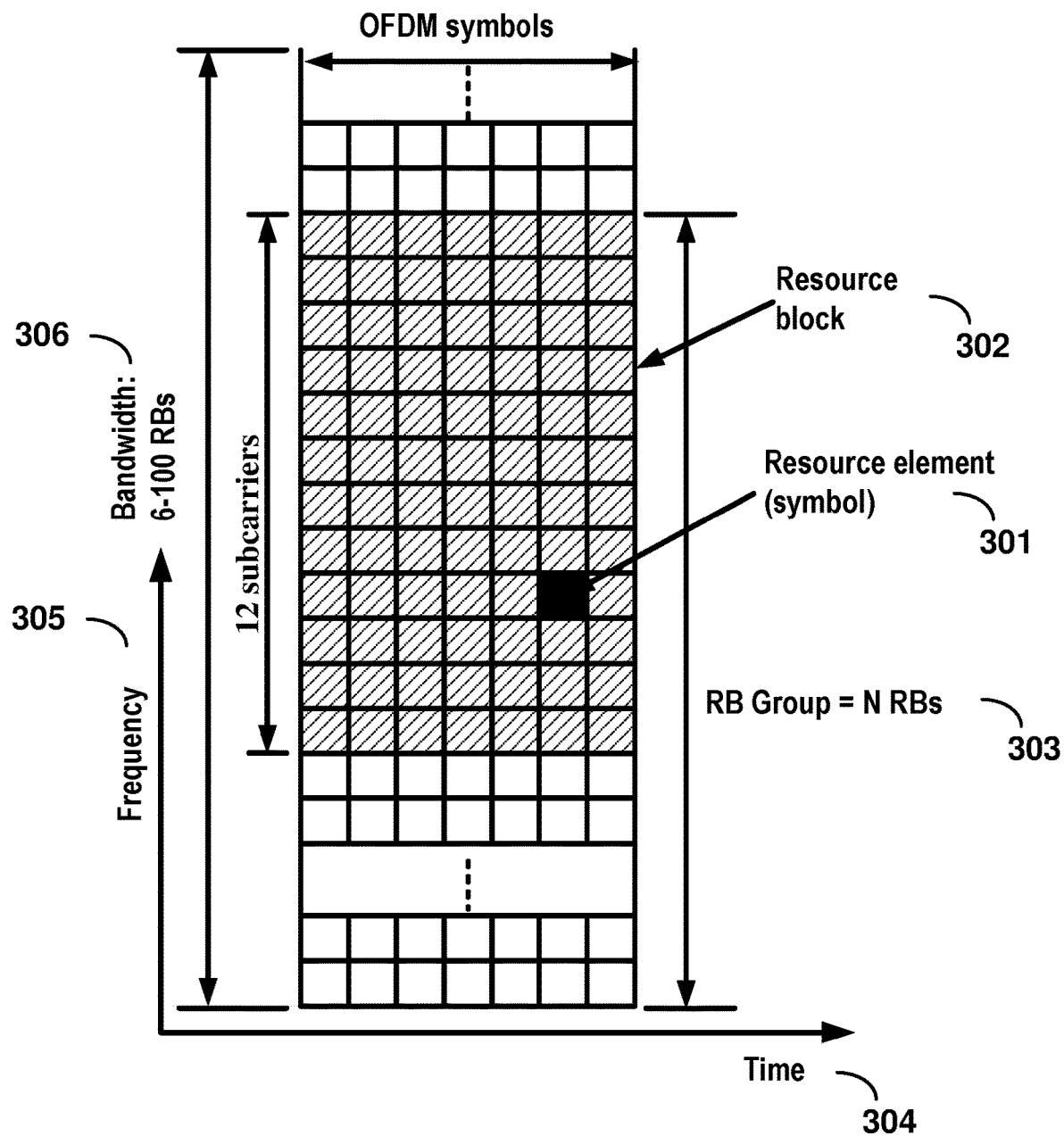
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
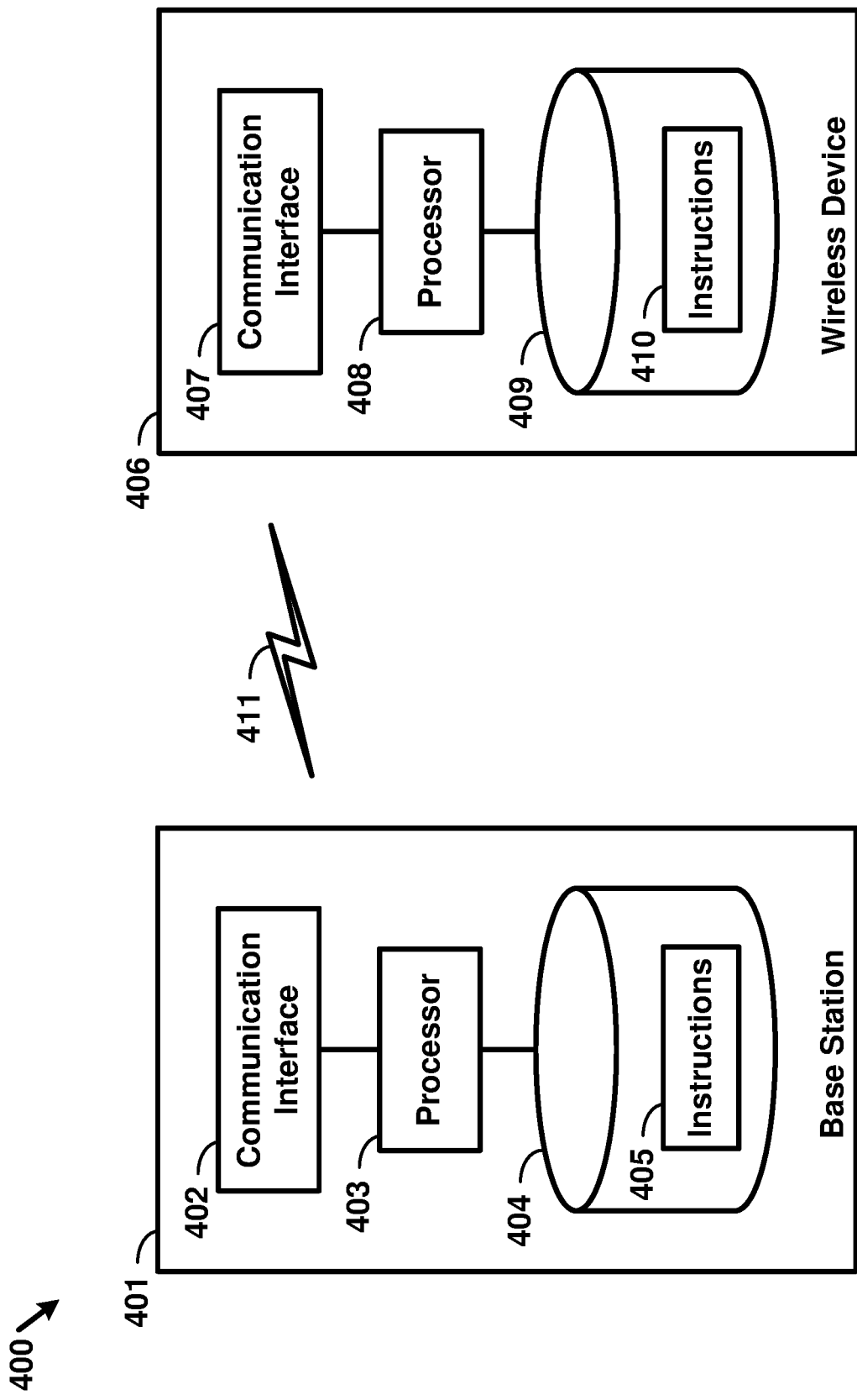
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
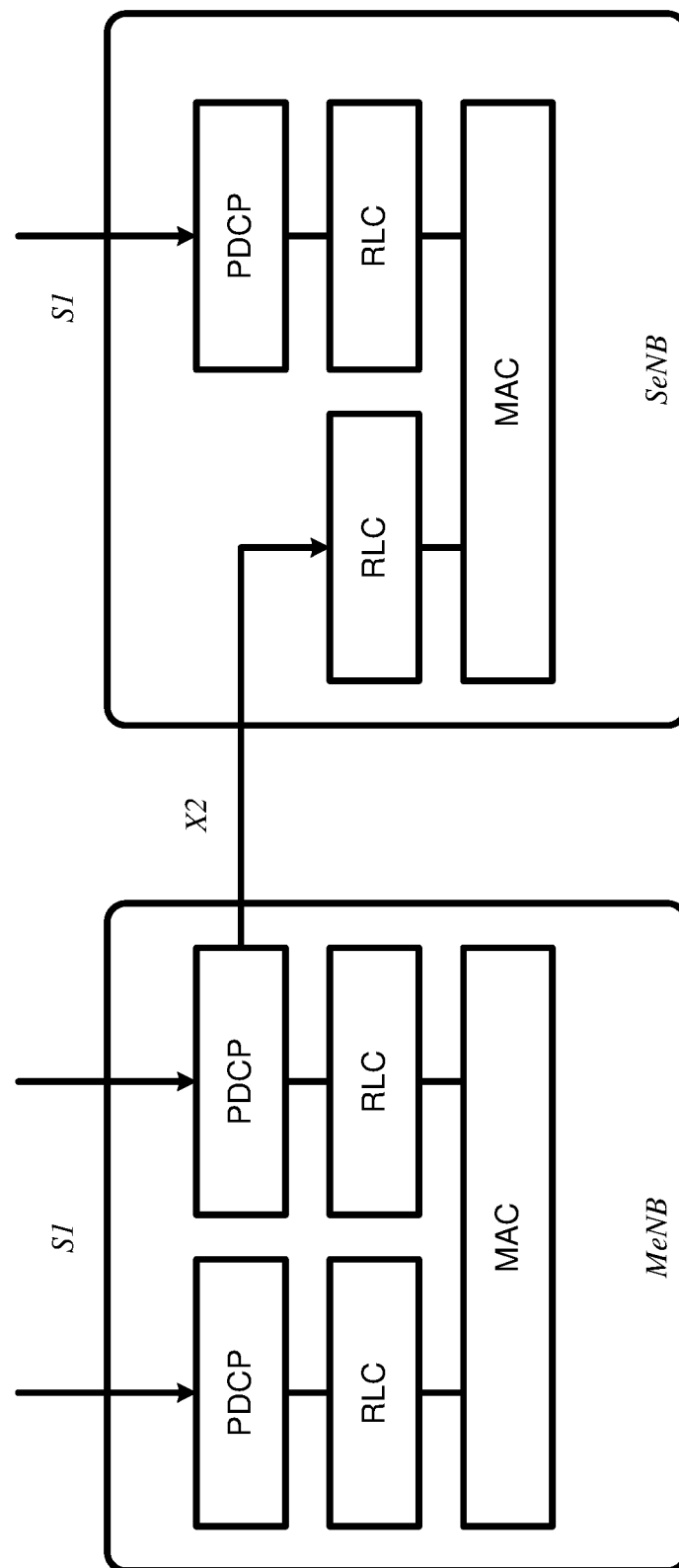
FIG. 6 is an example diagram for a protocol structure with CA and DC as per an aspect of an embodiment of the present disclosure.
Figure 7:
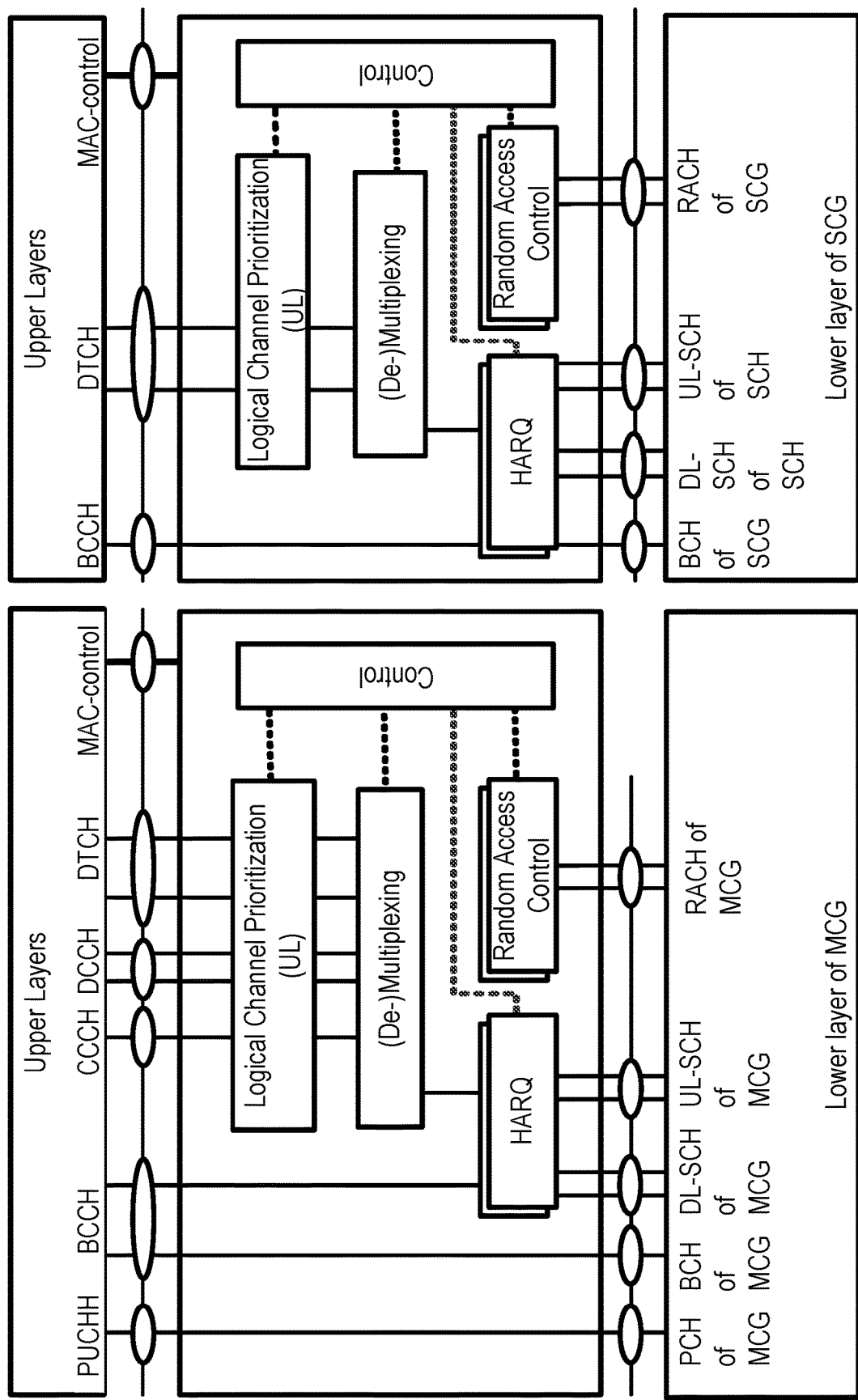
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
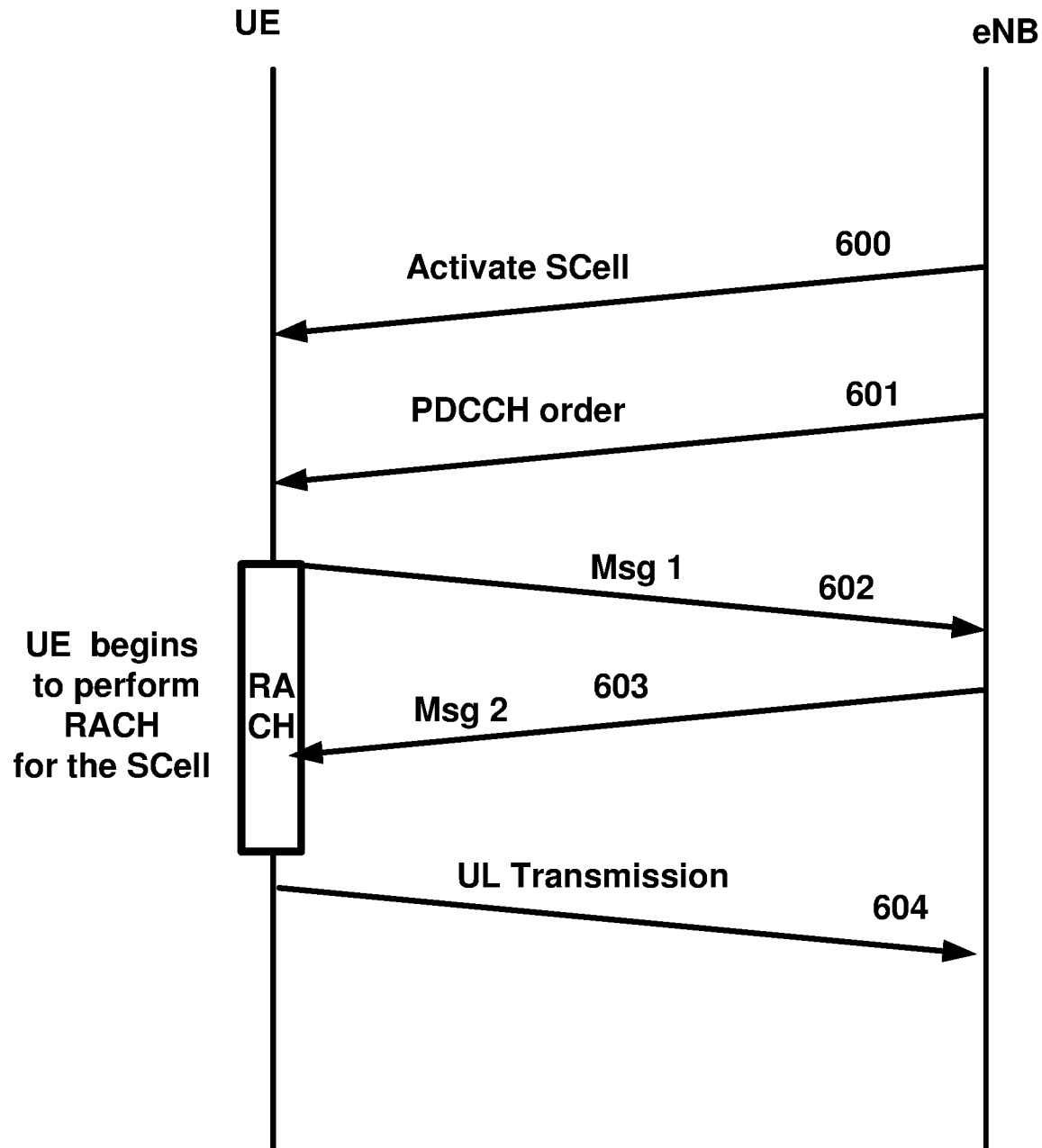
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602

(Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer may be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
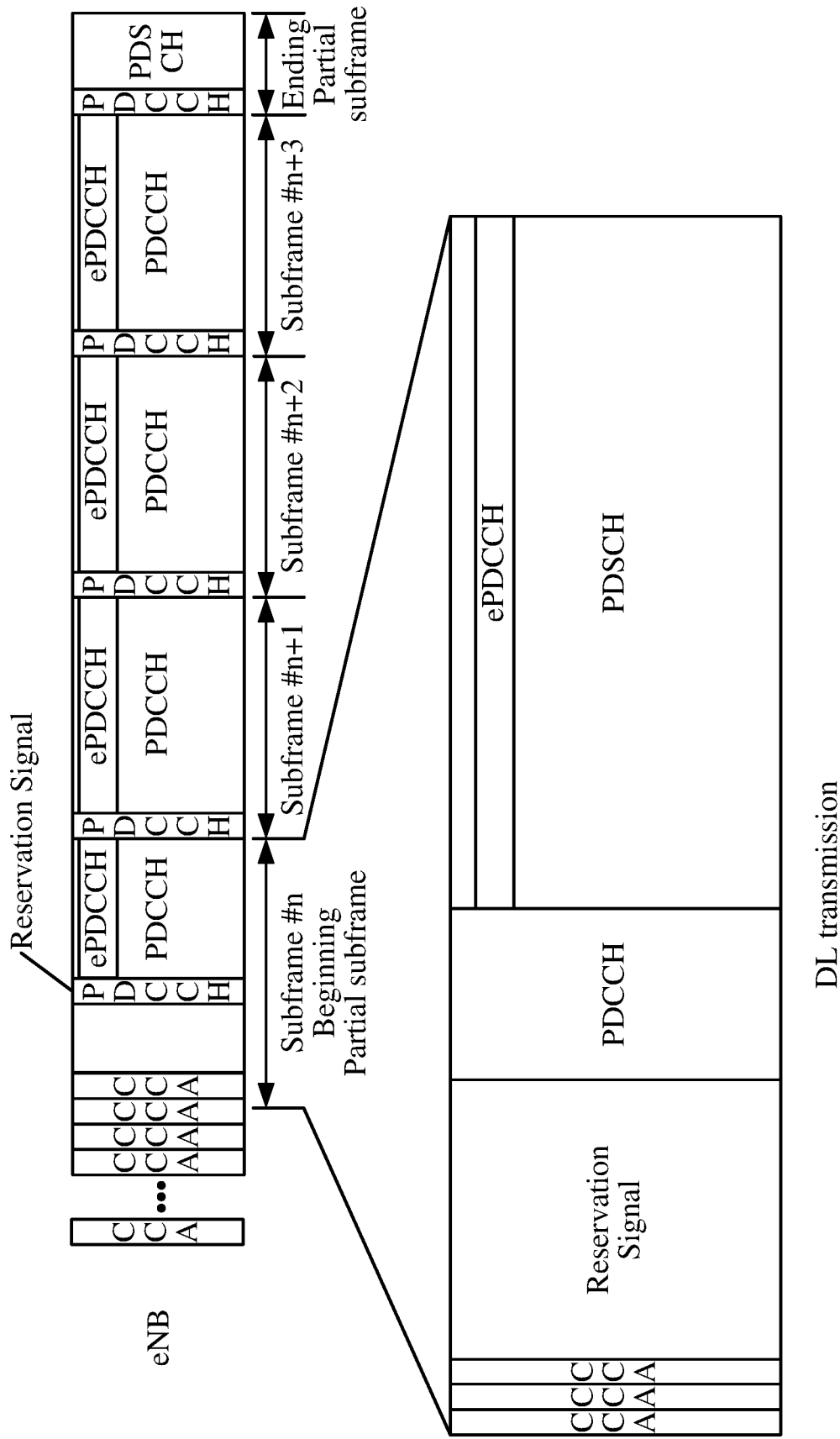
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

The ED (energy detection) threshold may depend on the knowledge on the presence of other radio access technologies (RATs), the set maximum transmit power of the eNB, and/or the carrier bandwidth. Power control may be implemented for a UE on UL. In some the cases, the UE may not use the full power for transmission (in many cases lower than the full power), considering that LAA may be targeting at small cell scenarios. This may be different from LAA DL, where the eNB may use full power when transmitting. If the UE maximum transmit power instead of the actual transmit power per UE UL burst is used to calculate the ED threshold, it may result in a lower threshold, which reduces the channel access probability. This may put some constraint on LAA UL LBT considering the possible low UE transmit power, which may correspond to a lower interference level the UE may cause to other transmissions. It may be appropriate to use the actual transmit power for UL for ED threshold calculation.

The ED threshold for UL LBT may be adjusted if the absence of any other technology sharing the carrier can be guaranteed on a long-term basis (e.g. by level of regulation). The UE may not have information about whether there is any other technology in the coverage area. The eNB may transmit one or more message/signal to the UE comprising information about the presence of other technologies and/or threshold parameters. The eNB may transmit one or more messages comprising configuration parameter of an LAA cell. The configuration parameters may comprise LBT threshold parameter(s) for one or more channels/signals. For example, the parameters may include one or more of the following: an offset parameter for one or more channels, information about presence of other technologies, LBT types for one or more channels, an LBT duration for one or more channels, threshold values for one or more channels, power control parameters for an LBT process, transmit parameters for one or more channels and/or other LBT parameters.

In an example, an eNB may transmit an RRC message and/or a DCI (e.g. uplink grant, or common DCI) comprising an offset. The UE may apply this additional offset when calculating the ED threshold. The eNB may adjust UL ED threshold employing RRC or physical layer singling (e.g. the threshold may be adjusted to a lower value when the eNB detects a hidden node).

In an example, an eNB may transmit an RRC message and/or a DCI (e.g. uplink grant, or common DCI) comprising one or more parameters. The one or more parameters may determine a dynamic range for ED threshold in a UE for uplink transmission. For example, a parameter may be employed by the UE to determine the upper limit of the ED threshold value. For example, a parameter may be employed by the UE to determine the lower limit of the ED threshold value. In an example, a UE may calculate an ED threshold value within the dynamic range. For example, if a calculated ED threshold is above the dynamic range, the UE may set the threshold at the maximum value in the range. For example, if a calculated ED threshold is below the dynamic range, the UE may set the threshold at the minimum value in the range. The configuration parameters may be UE specific. An eNB may configure an LBT ED threshold for a UE based on radio link conditions of the UE.

A UE may determine a dynamic range for an ED threshold in a UE for uplink transmission. For example, a UE may determine the upper limit of the ED threshold value. For example, a UE may determine the lower limit of the ED threshold value. In an example, a UE may calculate an ED threshold value within the dynamic range. For example, if a calculated ED threshold is above the dynamic range, the UE may set the threshold at the maximum value in the range. For example, if a calculated ED threshold is below the dynamic range, the UE may set the threshold at the minimum value in the range. The dynamic range may be UE specific. A UE may calculate the upper limit and/or the lower limit of the dynamic range base on the radio link parameters (e.g. path-loss estimate, CQI, RSRP measurements, etc.). A UE may also consider one or more parameters received from the eNB for calculating upper and/or lower limit(s) in a dynamic range. In an example embodiment, the UE may employ radio link parameters and/or parameters received from the eNB in determining/calculating the ED threshold.

The UL ED threshold may impact a UE channel access opportunity, throughput, as well as the fairness of co-existence with other RATs (e.g., Wi-Fi. ED threshold may be related to the bandwidth and/or UE transmission power). UL power may change depending on UL power control. For example, the ED threshold of UL LBT may vary within a more dynamic range of larger than 10 dB. In one example, eNB may signal the dynamic range of the ED threshold used by a UE for UL LBT by an RRC configuration and/or a DCI (e.g., UE-specific DCI or common DCI).

When the UE transmit power is lower, the corresponding CCA/ED threshold for UL LBT may be higher. A higher CCA threshold may limit the listening area, which may cause hidden nodes. When the UE transmit power is larger, the corresponding CCA/ED threshold for UL LBT may be lower. This may reduce the chance for the UE to successfully detect a clear channel using an LBT procedure and occupy the channel.

An eNB may configure to lower the UE max Transmission power for a cell. This may result in a higher CCA/ED threshold for UL LBT. In an example embodiment, if a UE did not successfully compete an unlicensed carrier during a period or for a number of times, the UE may lower the UE max Transmission power for a cell. The eNB may schedule the UE at a lower MCS level if needed to enable the transmission reliability with a lower power. When UL LBT ED threshold calculations employ an allowable configured max transmit power of a UE, the CCA/ED threshold may increase and may improve the chance of the UE to occupy the unlicensed carrier. In an example embodiment, a physical layer signal, for example, a UE specific DCI or a common DCI, may comprise of one or more parameters indicating an adjustment to the UE max allowable transmit power on a cell. For example, the one or more parameters may indicate an offset value. This may enable the eNB to update the UE max transmit power and UE ED threshold for uplink transmissions.

The ED threshold may be determined employing an RRC configuration parameter, (e.g. the maximum transmission power of UE ($P_{CMAX,\,c}$) and/or configured upper bound of transmission power ($\hat{P}_{EMAX,c}$)). An eNB may transmit one or more parameters employed to determine an updated maximum transmission power of the UE. The UE may determine/calculate an ED threshold employing the max transmit power. The updated maximum transmission power may be used by the UE to determine the uplink signal transmit power according to a power control formula.

An eNB may transmit a UE specific DCI or a common DCI comprising of one or more parameters to determine a UE maximum allowable transmission power. For example, the one or more parameters may indicate an offset power value. The UE may calculate/determine the ED threshold based on the updated maximum power. The UE may calculate/determine the UE transmit power based on the updated maximum power and uplink power control formulas.

The ED threshold may be determined by the transmission power of the UE. The transmission power may be controlled by an eNB. If the detected energy level at the UE side is larger than the CCA/ED threshold, the UE may drop the UL transmission. There may be some flexibility for LAA to increase the UL transmission opportunity by lowering UL transmission power. A UE may adjust its UL transmission power to effectively increase the ED threshold. The UL transmission opportunity may be increased with lower UL transmission power. In an example embodiment, a UE may lower its transmit power (e.g. autonomously) to increase the required ED threshold to pass LBT requirements.

In an example, an eNB may configure a power range in which a UE determines UL transmission power (e.g. to pass the ED threshold requirement). The UE may drop an UL transmission if the UL transmission power derived from the detected energy level of CCA is less than the lower bound configured employing one or more parameters received from an eNB.

In licensed assisted access (LAA) and enhanced LAA (eLAA), transmissions on unlicensed secondary cells (SCells) may be preceded with a listen-before-talk (LBT) procedure. LBT may involve detecting the energy level on an unlicensed carrier before transmission on the carrier. If the detected energy level on a carrier is less than a threshold, the eNB or UE may transmit on the carrier. For example, in downlink, an eNB accessing a channel on which LAA Scell(s) transmission(s) are performed, may set the energy detection (ED) threshold ($X_{Thresh}$) to be less than or equal to the maximum energy detection threshold $X_{Thresh\_max}$. For example, $X_{Thresh\_max}$ may be determined as follows:

If the absence of any other technology sharing the carrier can be guaranteed on a long-term basis (e.g. by level of regulation) then:

$$X_{Thresh\_max} = \min\left\{\begin{array}{l} T_{max} + 10 \text{ dB}, \\ X_r \end{array}\right\},$$

where $X_r$ is Maximum energy detection threshold defined by regulatory requirements in dBm when such requirements are defined, otherwise $X_r = T_{max} + 10$ dB Otherwise, $$X_{Thresh\_max} = \max\left\{\begin{array}{l} -72 + 10\log10(BW \text{ MHz}/20 \text{ MHz}) \text{ dBm} \\ \min\left\{\begin{array}{l} T_{max}, \\ T_{max} - T_A + (P_H + 10\log10(BW \text{ MHz}/20 \text{ MHz})) - P_{TX} \end{array}\right\} \end{array}\right\}$$

Where: $T_A = 10$ dB for transmission(s) including PDSCH; $T_A = 5$ dB for transmissions including discovery signal transmission(s) and not including PDSCH; $P_H = 23$ dBm; $P_{TX}$ is the set maximum eNB output power in dBm for the carrier; eNB uses the set maximum transmission power over a single carrier irrespective of whether single carrier or multi-carrier transmission is employed.

$$T_{max}(\text{dBm}) = 10 \cdot \log 10(3.16228 \cdot 10^{-8}(\text{mW/MHz}) \cdot BW \text{ MHz(MHz)});$$

where BW MHz is the single channel bandwidth in MHz.

A UE may transmit an uplink burst in one or more subframes. In some instances, an uplink burst may include a plurality of subframes (e.g. including partial subframes). Uplink grants may be for a single subframe or for a plurality of subframes. Uplink power calculations may be performed for a subframe or one or more symbols in a subframe. A calculated transmit power may be different in different subframes. A UE may determine transmit power in a subframe employing one or more of the following factors: channel conditions, path-loss measurements, power scaling in the UE, transmission of multiple channels in the subframe and/or the like. A UE may determine a different transmit power for different uplink channels based on uplink power control formulas. In an example embodiment, multiple signals may be transmitted on a subframe of a cell. For example, PUCCH and PUSCH may be transmitted in parallel in a subframe. In another example, PUSCH/PUCCH and an SRS signal may be transmitted in different symbols of a subframe. Transmit power during an uplink transmission burst including one or more subframe may change based on the above parameters and power control formulas implemented by a UE.

For the uplink, a UE accessing a channel on which SCell transmission is performed on SCell carrier c, may set the energy detection threshold for carrier c ($X_{Thresh,c}$) to be less than or equal to the maximum energy detection threshold on carrier c, $X_{Thresh,c\_Max}$. $X_{Thresh,c\_Max}$ may depend, at least, on a UE output transmit power and offset value. When UE output transmit power is higher, the threshold $X_{Thresh,c\_Max}$ may be higher as well. When the offset value is higher, the threshold $X_{Thresh,c\_Max}$ may be higher as well. The UE output transmit power and/or the offset value need to be determined for determining/calculating LBT threshold $X_{Thresh,c\_Max}$. There may be a need to enhance the determination mechanism for $X_{Thresh,c\_Max}$. Example embodiments of the invention provide enhanced mechanisms for determining $X_{Thresh,c\_Max}$. When the threshold is too high, the UE may transmit and interfere with some other existing transmissions. When the threshold is too low, the LBT in the UE may unnecessarily indicate a busy channel.

Various formulas may be implemented for determining the relationship between $X_{Thresh,c\_Max}$ and UE output transmit power and/or the offset value. An example mechanism, $X_{Thresh,c\_Max}$ may be determined as follows: If the absence of any other technology sharing the carrier can be guaranteed on a long-term basis (e.g. by level of regulation) then:

$$X_{Thresh,c\_Max} = \min\left\{\begin{array}{l} T_{max} + 10 \\ X_r \end{array}\right\},$$

where $X_r$ is Maximum energy detection threshold defined by regulatory requirements in dBm when such requirements are defined, otherwise $X_r = T_{max} + 10$. In an example implementation, a UE may use built-in mechanisms to determine the presence or absence of other technologies sharing the carrier. The built-in mechanism may be, in an example, one or more additional radio(s) capable of detecting the transmissions by other technologies such as but not limited to beacons transmitted by other Wi-Fi access points and/or detecting the physical layer convergence protocol's (PLCP) protocol data units (PPDUs) transmitted by other Wi-Fi devices and/or access points in the vicinity.

In an example implementation, eNB may use the built-in mechanisms to determine the presence or absence of other technologies sharing the carrier and signal to the UE, whether other technologies are present or absent. The signaling may be common DCI and/or UE-specific DCI (e.g., included the uplink grant and/or downlink scheduling assignment and/or other DCI transmitted on a regular basis).

If the absence of any other technology sharing the carrier cannot be guaranteed on a long-term basis (e.g. by level of regulation) then:

$$X_{Thresh,c\_max} = \max \begin{cases} -72 + 10\log10(BW \text{ MHz}_c/20 \text{ MHz}) \text{ dBm} \\ \min \begin{cases} T_{max,c}, \\ T_{max,c} - T_A + (P_H + 10\log10(BW \text{ MHz}_c/20 \text{ MHz})) - P_{TX} \end{cases} \end{cases}$$

Where: $P_H$=23 dBm; $T_{max,c}$=10·log 10(3.1622810$^{-8}$ (mW/MHz)BW MHz$_c$(MHz)); and BW MHz$_c$ is the channel bandwidth in MHz on unlicensed carrier c.

The above formulas are an example method to determine the threshold. In an example implementation, some of the factors may change. For example, $P_H$ may be set to a different value, (e.g. 21 dBm, 25 dBm, etc.). In an example, ED threshold may be influenced by the values for offset value (e.g. $T_A$) and UE output transmit power (e.g. $P_{TX}$). If the value of $T_A$ and/or $P_{TX}$ are different for different physical channel and/or signals, the calculated ED threshold for different physical channels and/or signals may be different. In an example embodiment, $P_{TX}$ and/or $T_A$ may be different for different physical channels and/or signals transmitted in one or more subframes. In an example, embodiment, the $P_{TX}$ and/or $T_A$ for the physical channels and/or signals may be the same. In an example, the $P_{TX}$ and/or $T_A$ value may be different for different physical channels and/or signals. In an example embodiment, the $T_A$ value for the physical channels and/or signals may be the same but the $P_{TX}$ value may be different for different physical channels and/or signals.

In an example embodiment, the calculated ED thresholds may be different for different physical channel and/or signals in a subframe (in case of single-subframe grant) or a burst (in case of multi-subframe grant). A UE may consider the lowest ED threshold among the calculated ED threshold values and perform the LBT based on this lowest ED threshold.

In one implementation, if a UE is configured to transmit multiple physical channels and/or signals in a subframe or a burst, the ED threshold used for LBT may be determined based on the power of one or more of the multiple channels/signals. A UE may calculate a different power for different channels/signals. A UE may determine the total transmit power on different symbols of a subframe. For example, a UE may transmit PUCCH and/or PUSCH and then transmit SRS in a given subframe. A UE may consider a threshold employing, at least, a maximum of the following two values: (1) the lowest of the calculated ED thresholds corresponding to the channels and/or signals that UE is configured to transmit in a subframe (in case of a single-subframe grant) or multiple consecutive subframes (e.g., in case of a multi-subframe grant); and (2) the calculated ED threshold corresponding to the first physical channel and/or signal in the subframe or the burst. In an example, a UE may consider a threshold employing, a combination of the following two values: (1) the lowest of the calculated ED thresholds corresponding to the channels and/or signals that UE is configured to transmit in a subframe (in case of a single-subframe grant) or multiple consecutive subframes (e.g. in case of a multi-subframe grant); and (2) the calculated ED threshold corresponding to the first physical channel and/or signal in the subframe or the burst. For example, the combination may be an average, a weighted average, any formula using both values, and/or the like. In an example embodiment, an RRC configuration parameter may be used to calculate an ED threshold when multiple channels/subframes are transmitted. In an example implementation, after starting transmission of a burst, the UE may stop transmission if a calculated ED threshold for a physical channel and or signals to be transmitted is smaller than the ED threshold used for LBT.

In an example embodiment, an offset value (e.g. $T_A$ is considered here, examples may be applied to other offset parameters) may depend on the type of the uplink physical channel and/or signal that UE is configured to transmit after gaining access to the channel. For example, $T_A$ may equal to 10 dB for PUSCH transmission. In an example, $T_A$ may have a larger value when a UE is configured to transmit PUCCH or PUSCH carrying UCI than when UE is configured to transmit PUSCH carrying data only (e.g., $T_A$ may equal to 5 dB) so that transmission of control information has a higher chance of success with a higher ED threshold for LBT.

In an example implementation, if a UE transmits multiple physical channels or signals in a subframe, $T_A$ used for ED threshold calculation may be a largest value of $T_A$ for one or more physical channels and/or signals transmitted in the subframe. In case LBT is performed before transmission of a burst comprising of multiple subframes (e.g., in case the uplink grant is for multiple subframes) and different types of physical channels and/or signals are transmitted in the burst, $T_A$ used for ED threshold calculation, may be a largest value of $T_A$ for one or more the physical channels and/or signal transmitted in the burst.

In one example implementation, if UE is configured to transmit multiple physical channels and/or signals in a subframe, $T_A$ used for ED threshold calculation may be a minimum of the following two values: (1) the largest $T_A$ for physical channels and/or signals in the subframe; and (2) the $T_A$ for the first physical channel and/or signal in the subframe. In case LBT is performed before transmission of a burst comprising of multiple subframes (e.g., in case the uplink grant is for multiple subframes) and different types of physical channels and/or signals are in the burst, $T_A$ used for ED threshold calculation may be minimum of the following two values: (1) the largest $T_A$ of the physical channels and/or signal in the burst; and (2) the $T_A$ or the first physical channel and/or signal in the burst. In an example, a UE may consider a $T_A$ employing a combination of the following two values: (1) the largest $T_A$ for physical channels and/or signals in the subframe; and (2) the $T_A$ for the first physical channel and/or signal in the subframe. In case LBT is performed before transmission of a burst comprising of multiple subframes (e.g., in case the uplink grant is for multiple subframes) and different types of physical channels and/or signals are in the burst, the $T_A$ used for ED threshold calculation may be minimum of the following two values: (1) the largest $T_A$ of the physical channels and/or signal in the burst; and (2) the $T_A$ for the first physical channel and/or signal in the burst. For example, the combination may be an average, a weighted average, any formula using both values, and/or the like. In an example embodiment, an RRC configuration parameter may be used to calculate ED threshold when multiple channels/subframes are transmitted.

In an example implementation, after starting transmission of a burst, a UE may stop transmission when the $T_A$ for a physical channel and/or signal to be transmitted is smaller than the $T_A$ used for ED threshold calculation.

In an example embodiment, the values of $T_A$ for different physical channels and/or signals may be RRC configured. In an example implementation, one or several possible $T_A$ values may be configured by RRC for one or more physical channels and/or signals.

In an example embodiment, the value of $T_A$ for ED threshold calculation may be signaled by an eNB to the UE using UE-specific DCI (e.g., indicated in the uplink grant and/or downlink scheduling assignment and/or other DCI transmitted on a regular basis) or may be signaled using common DCI. In an example implementation, the DCI may include a field comprising of 1, 2 or more bits and each combination may indicate a value of $T_A$ for ED threshold calculation. In an example implementation, an RRC message may include several possible values and the DCI may indicate one of several possible values that are RRC configured by the eNB.

In an example implementation, an eNB may signal the UE, using UE-specific DCI (e.g., indicated in the uplink grant and/or downlink scheduling assignment and/or other DCI transmitted on a regular basis), and/or to the UEs or group of UEs in a cell (e.g., using common DCI) an offset for $T_A$ from what is configured (e.g., by RRC configuration). In an example implementation, the signaling may contain a field comprising of 1, 2 or more bits and a combination may indicate an offset value. The UE(s) may apply the offset to the specified and/or RRC configured $T_A$ value and use the result for ED threshold calculation.

In the uplink of an LAA cell, UEs may apply uplink power control using a set of algorithms to determine the power of different physical channels and signals and ensure that they are received by an eNB at an appropriate level while minimizing the amount of inter-cell interference. The power control algorithms may employ open-loop and closed-loop mechanisms. The open-loop power control mechanism may rely on estimates of the path loss on the downlink while the closed-loop power control mechanism may be based on explicit power control commands by eNB. The power control commands may be included in DCI such as uplink grants and/or downlink scheduling assignments and/or DCI that simultaneously provides power control commands for a group of UEs (e.g., DCI format 3 or 3A). Different power control algorithms may be applied to different the uplink physical channels and signals (e.g., PUCCH, PUSCH, PRACH and SRS). In the case of carrier aggregation, there may be a configured maximum transmit power $P_{CMAX, c}$ for a carrier c which may be different for different carriers. The power control algorithm for a physical channel and/or signal may enable that a calculated power does not exceed $P_{CMAX, c}$. The sum of $P_{CMAX, c}$ for the configured carriers in case of carrier aggregation may exceed a maximum UE transmit power. In case of carrier aggregation and in a power-limited case where the sum of calculated power for transmission on the carriers in a subframe exceeds the maximum UE transmit power, a UE may give higher priority to PUCCH transmission and/or to PUSCH transmission carrying L1/L2 control signaling by allocating the same power calculated by their power control algorithm. A UE may then scale the power level of PUSCHs transmitted in a subframe on different carriers such that sum of the power on the carriers does not exceed the UE maximum power.

In an example embodiment, $P_{TX}$, used for ED threshold calculation in uplink LBT, may be the eNB configured value $P_{CMAX, c}$, which may be the maximum possible transmit power on a carrier c used for power control calculations of different physical channels or signals on carrier c. In an example embodiment, $P_{TX}$, used for ED threshold calculation in uplink LBT, may be a configured upper bound of transmission power ($P_{EMAX,c}$). In an example, $P_{TX}$ may be a function of one or more transmit power values, e.g. an offset value may be considered to adjust these parameters.

In an example embodiment, $P_{TX}$ may be the highest of the actual transmission powers of channels and/or signals that a UE is configured to transmit in symbols of a subframe (in case of a single-subframe grant) or symbols of multiple consecutive subframes (in case of a multi-subframe grant) whose power levels are calculated and known by the UE at the time UE performs the LBT. In some examples, the transmission power in a subframe may be a sum of transmit power(s) of one or more channels transmitted in parallel in a cell. For example, PUCCH and PUSCH may be transmitted in parallel. In an example, in a single subframe grant, PUCCH and/or PUSCH may be transmitted in the first n symbols (e.g. n=13) and SRS may be transmitted in the last symbol. In an example, in a multi-subframe grant, PUSCH and/or PUCCH may be transmitted in a first subframe with a first transmit power, PUSCH and/or PUCCH may be transmitted in a second subframe with a second transmit power, and/or a PRACH signal may be transmitted in a third subframe with a PRACH power. In an example, an SRS may be transmitted in a symbol of a subframe.

In an example implementation, a UE may calculate/determine a threshold and/or offset base on the information about signals (e.g. channels) and the transmit power in one or more subframes in the uplink transmission. The UE may perform LBT based on the threshold and/or offset. A UE may continue transmission of a burst, if the power levels of physical channels and/or signals that are transmitted in the later symbols/subframes of the burst, which are not considered by the UE at the time UE calculates the ED threshold for LBT. A calculated transmit power for a subframe and/or symbol may be larger than the maximum of transmission power levels of the physical channels and/or signals that are considered by the UE at the time UE calculates the ED threshold. In an example, the UE may not increase the power in a subframe and/or symbol above the transmit power considered by the UE for threshold calculations.

In an example implementation, where a transmission burst is scheduled for multiple subframes (e.g. with a single multi-subframe grant), the UE may calculate the ED threshold based on calculated power levels (e.g., highest power level among one or more calculated power levels) of the subframes without considering the possible adjustment and/or scaling of the transmission power levels on different subframes due to transmission on other licensed and/or unlicensed carriers. The UE may adjust/scale transition powers of a subframe if needed based on power control formulas.

In an example embodiment, where uplink bursts are scheduled to be transmitted by a UE on multiple licensed and/or unlicensed carriers, the UE may calculate the transmission power levels of different physical channels and/or signals on a carrier with different assumptions on the success and/or failure of LBT on the unlicensed carriers and hence the number of active transmission after LBT. The UE may calculate a set of $P_{TX}$ values for the unlicensed carriers, corresponding to the different combinations of success and/or failure of LBT on different unlicensed carriers. The UE may calculate a set of ED thresholds for LBT on each unlicensed carrier corresponding to the set of $P_{TX}$ values for an unlicensed carrier. In one implementation, the UE may detect the energy level on an unlicensed carrier and based on the detected energy levels on different carriers, the UE may select the combination of $P_{TX}$ and ED threshold on an unlicensed carrier such that the number of carriers with successful LBT and/or other criteria is increased. In one implementation, the UE may give higher priority to one or more unlicensed carriers and may select the combination of $P_{TX}$ and ED threshold on an unlicensed carrier such that LBT for unlicensed carriers with higher priority are successful.

In one implementation, if a UE is configured to transmit multiple physical channels and/or signals in a subframe or a burst, $P_{TX}$ used for ED threshold calculation may employ the minimum of following two values: (1) the highest of the actual transmission powers of channels and/or signals that UE is configured to transmit in a subframe (in case of a single-subframe grant) or multiple consecutive subframes (in case of a multi-subframe grant) whose power levels are calculated and known by the UE at the time UE performs the LBT; and (2) the power level of the first physical channel and/or signal in the subframe or the burst. In an example, a UE may consider a $P_{TX}$ used for ED threshold calculation employing, a combination of the following two values: (1) the highest of the actual transmission powers of channels and/or signals that UE is configured to transmit in a subframe (in case of a single-subframe grant) or multiple consecutive subframes (in case of a multi-subframe grant) whose power levels are calculated and known by the UE at the time UE performs the LBT; and (2) the power level of the first physical channel and/or signal in the subframe or the burst. For example, the combination may be an average, a weighted average, or any formula using both values. In an example embodiment, an RRC configuration parameter may be used to calculate ED threshold when multiple channels/subframes are transmitted. In an example implementation, after starting transmission of a burst, UE may stop transmission when the $P_{TX}$ for a physical channel and/or signals to be transmitted is larger than the $P_{TX}$ used for ED threshold calculation.

In an example implementation, $P_{TX}$ may be a value less than $P_{CMAX,\ c}$ (e.g., a fraction of $P_{CMAX,\ c}$ or an offset from $P_{CMAX,\ c}$), or the upper bound of $P_{CMAX,\ c}$, that may be signaled (e.g., the explicit $P_{TX}$ value and/or the fraction and/o the offset) to the UE with a UE-specific DCI (e.g., indicated in the uplink grant and/or downlink scheduling assignment and/or DCI transmitted in a regular basis) or a common DCI. An example is for the UEs that are close to eNB and their transmission power may be relatively small. Such UEs may generate small levels of interference to other transmissions and small ED threshold may be overly conservative. An example is that certain uplink transmissions may have a higher priority for the eNB and eNB may allow the UE to use a lower $P_{TX}$ value and correspondingly higher ED threshold for the certain uplink transmissions. The indication may be in form of a fraction of $P_{CMAX,\ c}$ (e.g. an offset value) that UE may use to calculate the ED threshold. In an example implementation, the DCI may contain 1, 2 or more bits and a combination may indicate a certain fraction (e.g. an offset value) of $P_{CMAX,\ c}$ that may be used by the UE for ED threshold calculation. In an example, the updated $P_{CMAX,\ c}$ may be employed for uplink power calculations. In an example implementation, an eNB may RRC configure multiple $P_{TX}$ values where a value corresponds to a range of the UE path-loss estimates and depending on the path-loss estimate at the UE, the UE may consider one of these configured values as $P_{TX}$ and use the value for ED threshold calculation. In an example embodiment, one or more parameters may be communicated to a UE using DCI signals and may be used for calculation of transmit power as well as threshold calculations.

In an example embodiment, a UE may set the $P_{TX}$ value equal to $P_{CMAX,\ c}$, or a fraction of $P_{CMAX,\ c}$ based on downlink signaling, for ED threshold calculation on unlicensed carrier c. The value of $P_{CMAX,\ c}$ may be configured by eNB. If the UE receives a command from eNB in during an uplink transmission burst on LAA SCell c, for which LBT has been completed with the ED threshold calculated based on the current value of $P_{CMAX,\ c}$ and channel access right has been gained, to change the value of $P_{CMAX,\ c}$, the UE may continue transmission of current burst and the new value of $P_{CMAX,\ c}$ may be used for calculating the ED threshold for LBT attempts.

In an example embodiment, if a UE is scheduled to transmit multiple physical channels and/or signals in a subframe or a burst, the UE may calculate the ED threshold by considering the $P_{TX}$ as the power level corresponding to the first physical channel and/or signal in the subframe or the burst. The UE may update the power level calculated for a physical channel and/or signal (e.g., using power control algorithms) transmitted after the first physical channel and/or signal employing a minimum of the following values: (1) $P_{TX}$; and (2) a calculated power level of the physical channel and/or signal to be transmitted.

In an example implementation, if a UE is configured to transmit multiple physical channels and/or signals in a subframe or a burst, the UE may calculate the ED threshold by considering the $P_{TX}$ employing the maximum of the following two values: (1) the power level corresponding to the first physical channel and/or signal in the subframe or the burst; and (2) the maximum of the power levels calculated for transmission of PUCCHs or PUSCHs carrying UCI in the burst. The UE may update the power level calculated for a physical channel and/or signal (e.g., using power control algorithms) transmitted after the first physical channel and/or signal as the minimum values: (1) $P_{TX}$; and (2) calculated power level of the physical channel and/or signal.

Figure 11:
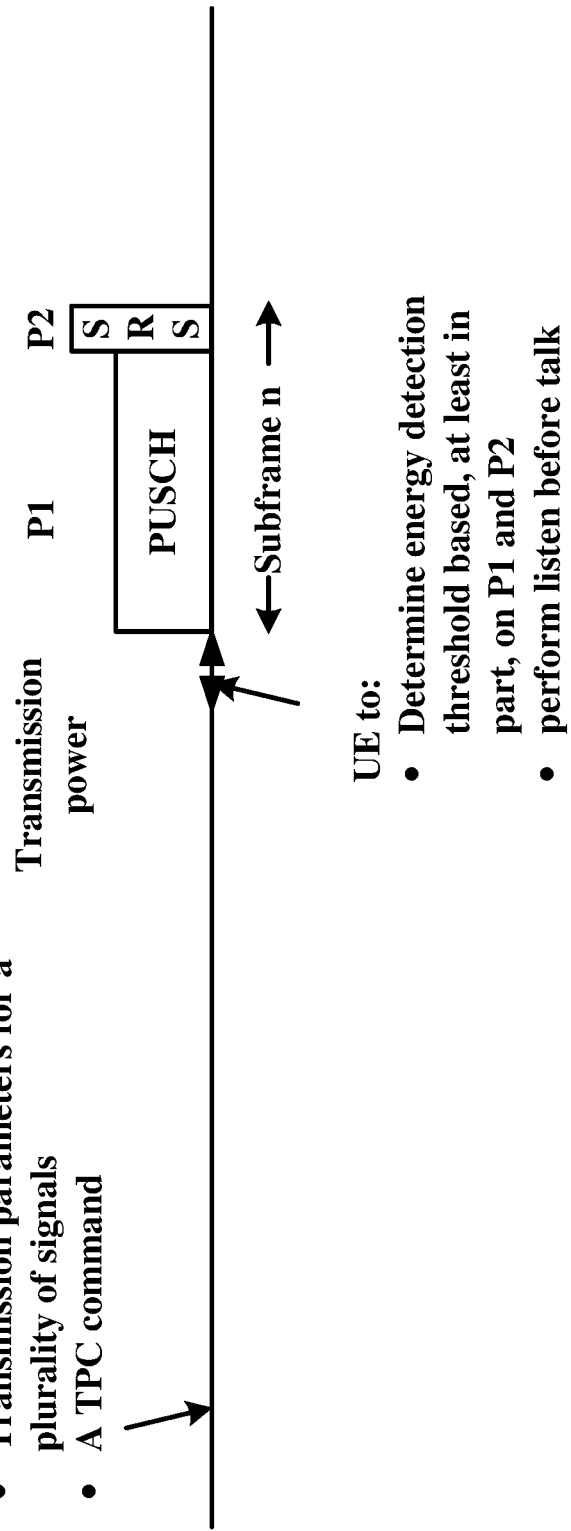
FIG. 11 is an example diagram depicting uplink signal transmissions as per an aspect of an embodiment of the present disclosure.
Figure 12:
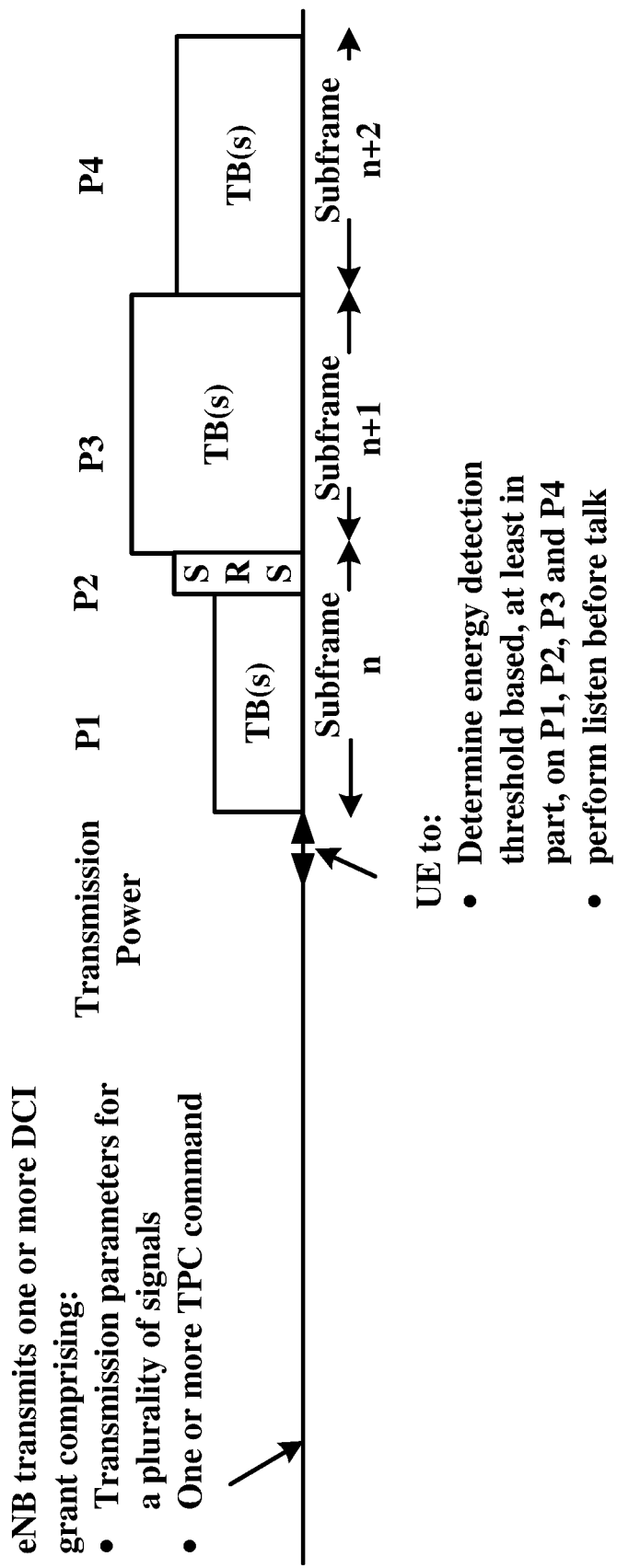
FIG. 12 is an example diagram depicting uplink signal transmissions as per an aspect of an embodiment of the present disclosure.

In an example embodiment, the UE may receive one or more messages comprising configuration parameters for a licensed assisted access (LAA) cell. The UE may receive one or more downlink control information (DCI) comprising transmission parameters for a plurality of signals. The one or more DCI may comprise one or more power control commands. The UE may calculate a transmission power of each of the plurality of signals employing the one or more power control commands. The UE may calculate an energy detection threshold based, at least in part, on the transmission power of the plurality of signals. The UE may perform an LBT procedure employing the energy detection threshold. The UE may transmit the plurality of signals if the LBT procedure indicates a clear channel. In an example, the configuration parameters may comprise one or more listen before talk (LBT) configuration parameter for the LAA cell. In an example, calculating the energy detection threshold may further employ the one or more LBT configuration parameter. In an example, the plurality of signals may comprise one or more sounding reference signals (SRSs). In an example, the plurality of signals may comprise one or more physical uplink control channels (PUCCHs). In an example, calculating the energy detection may employ a maximum of the transmission power of each of the plurality of signals. In an example, calculating the energy detection may employ a transmission power of a first signal in the plurality of signals. In an example, the calculating the energy detection may employ a maximum of (1) a transmission power of a first signal in the plurality of signals, and (2) a maximum of the transmission power of each of the plurality of signals. In an example embodiment shown in FIG. 11, the plurality of signals may be transmitted in a subframe. In an example embodiment shown in FIG. 12, the plurality of signals may be transmitted in an uplink burst may comprise a plurality of subframes. In an example, the one or more DCI may comprise a multi-subframe grant.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 13:
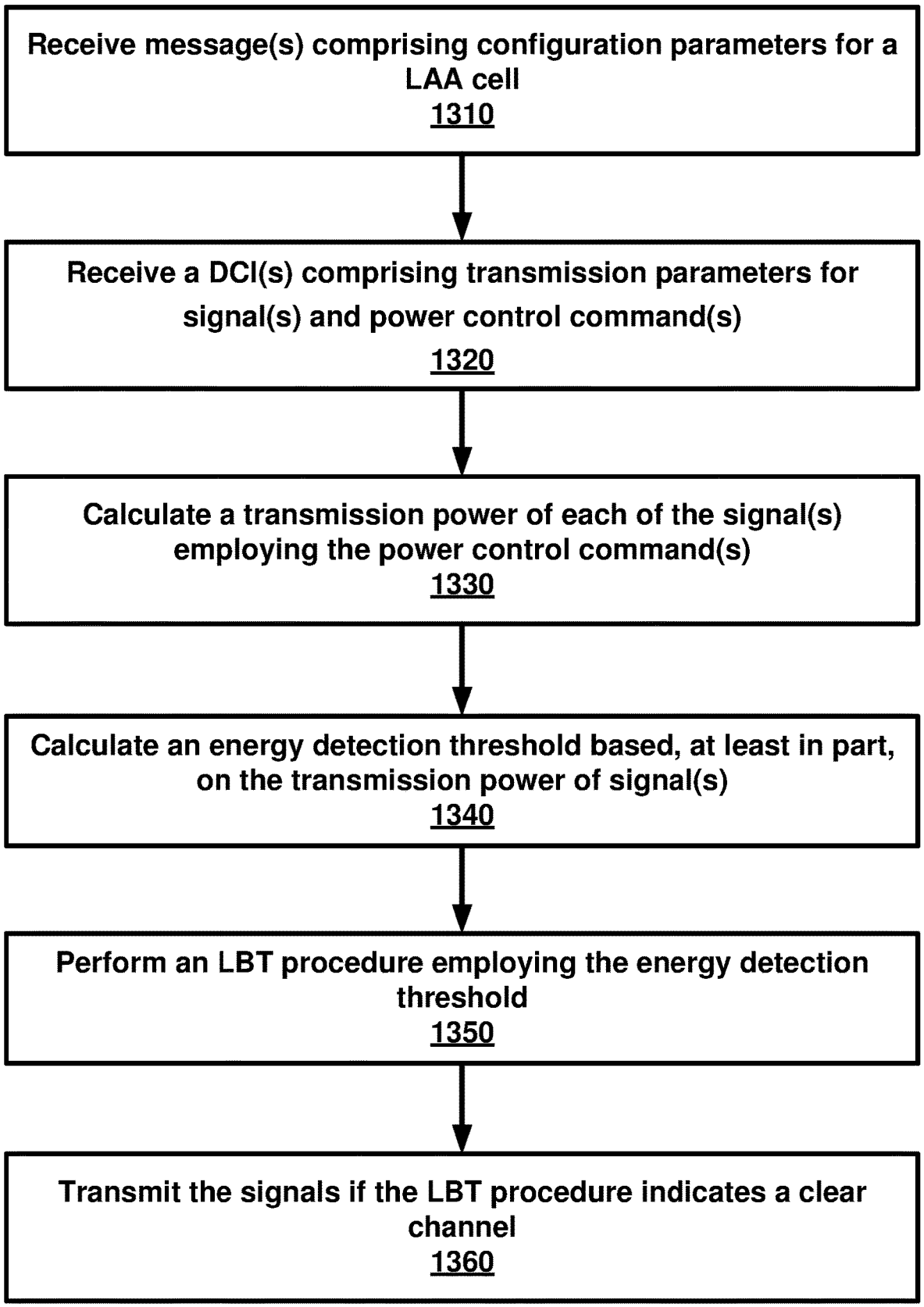
FIG. 13 is an example flow diagram as per an aspect of an embodiment of the present disclosure.

FIG. 13 is an example flow diagram as per an aspect of an embodiment of the present disclosure. At 1310, a wireless device may receive one or more messages. The one or more messages may comprise configuration parameters for a licensed assisted access (LAA) cell. At 1320, the wireless device may receive one or more downlink control information (DCI). The one or more DCI may comprise transmission parameters for a plurality of signals and one or more power control commands. At 1330, the wireless device may calculate a transmission power of each of the plurality of signals employing the one or more power control commands. At 1340, a wireless device may calculate an energy detection threshold based, at least in part, on the transmission power of at least one of the plurality of signals. At 1350, the wireless device may perform a listen before talk (LBT) procedure employing the energy detection threshold. At 1360, a wireless device may transmit the plurality of signals if the LBT procedure indicates a clear channel.

The configuration parameters may comprise, for example, one or more LBT configuration parameters for the LAA cell. The calculating the energy detection threshold further employ, for example, the one or more LBT configuration parameters. The plurality of signals may comprise, for example, one or more sounding reference signals (SRSs). The plurality of signals may comprise, for example, one or more physical uplink control channels (PUCCHs). The calculating the energy detection threshold may employ, for example, a maximum of the transmission power of each of the plurality of signals. The calculating the energy detection threshold may employ, for example, a first transmission power of a first signal in the plurality of signals. The calculating the energy detection threshold may employ, for example, a maximum of a first transmission power of a first signal in the plurality of signals and a maximum of the transmission power of each of the plurality of signals. The plurality of signals may be, for example, transmitted in a subframe. The plurality of signals may be, for example, transmitted in an uplink burst comprising a plurality of subframes. The one or more DCI may comprise, for example, a multi-subframe grant.

Figure 14:
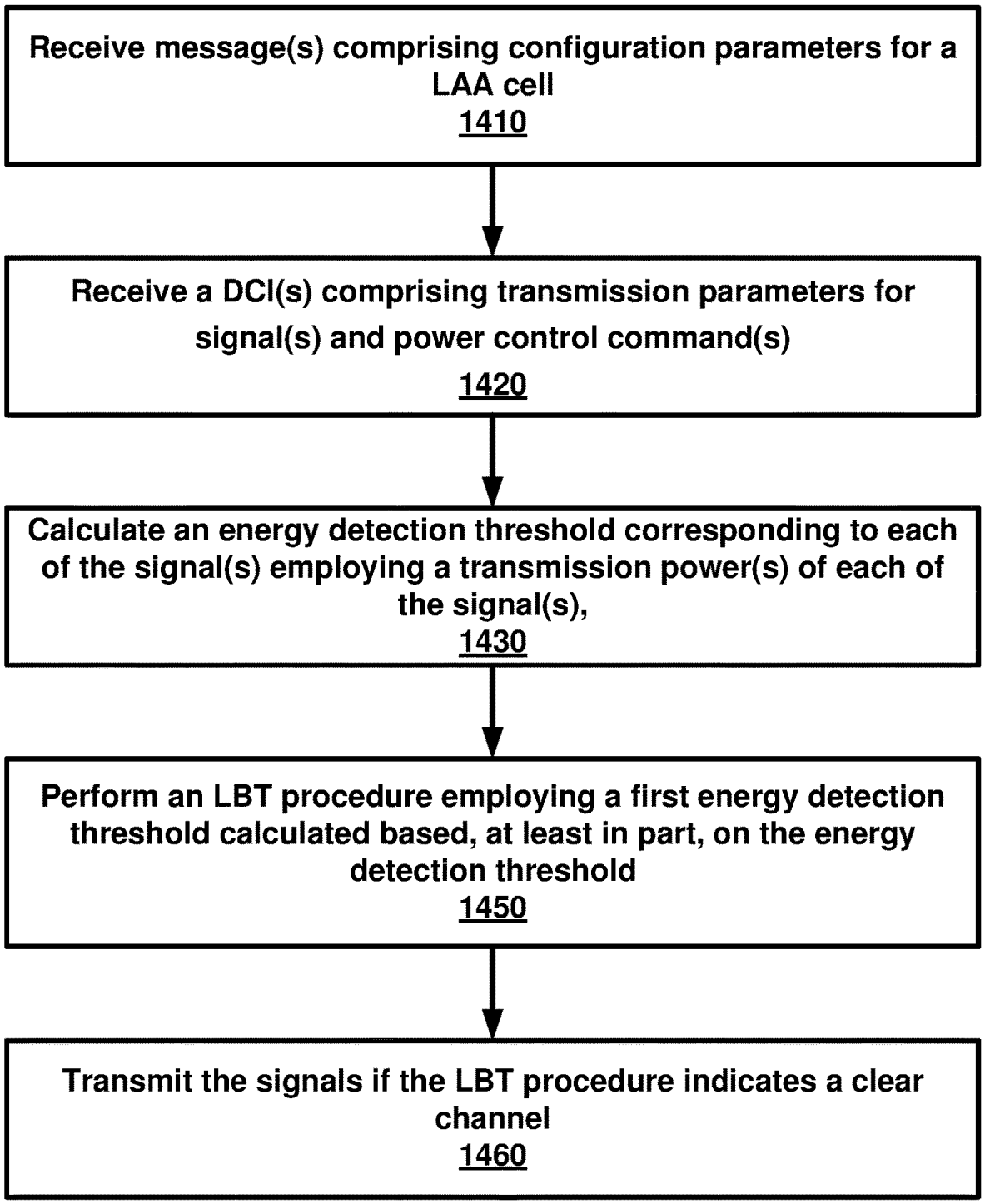
FIG. 14 is an example flow diagram as per an aspect of an embodiment of the present disclosure.

FIG. 14 is an example flow diagram as per an aspect of an embodiment of the present disclosure. At 1410, a wireless device may receive one or more messages. The one or more messages may comprise configuration parameters for a licensed assisted access (LAA) cell. At 1420, the wireless device may receive one or more downlink control information (DCI). The one or more DCI may comprise transmission parameters for a plurality of signals and one or more power control commands. At 1430, the wireless device may calculate an energy detection threshold corresponding to each of the plurality of signals employing a transmission power of each of the plurality of signals. The transmission power may depend on the one or more power control commands. At 1440, the wireless device may perform an LBT procedure employing a first energy detection threshold. The first energy detection threshold may be calculated based, at least in part, on the energy detection threshold corresponding to the plurality of signals. At 1460, the wireless device may transmit the plurality of signals if the LBT procedure indicates a clear channel.

Figure 15:
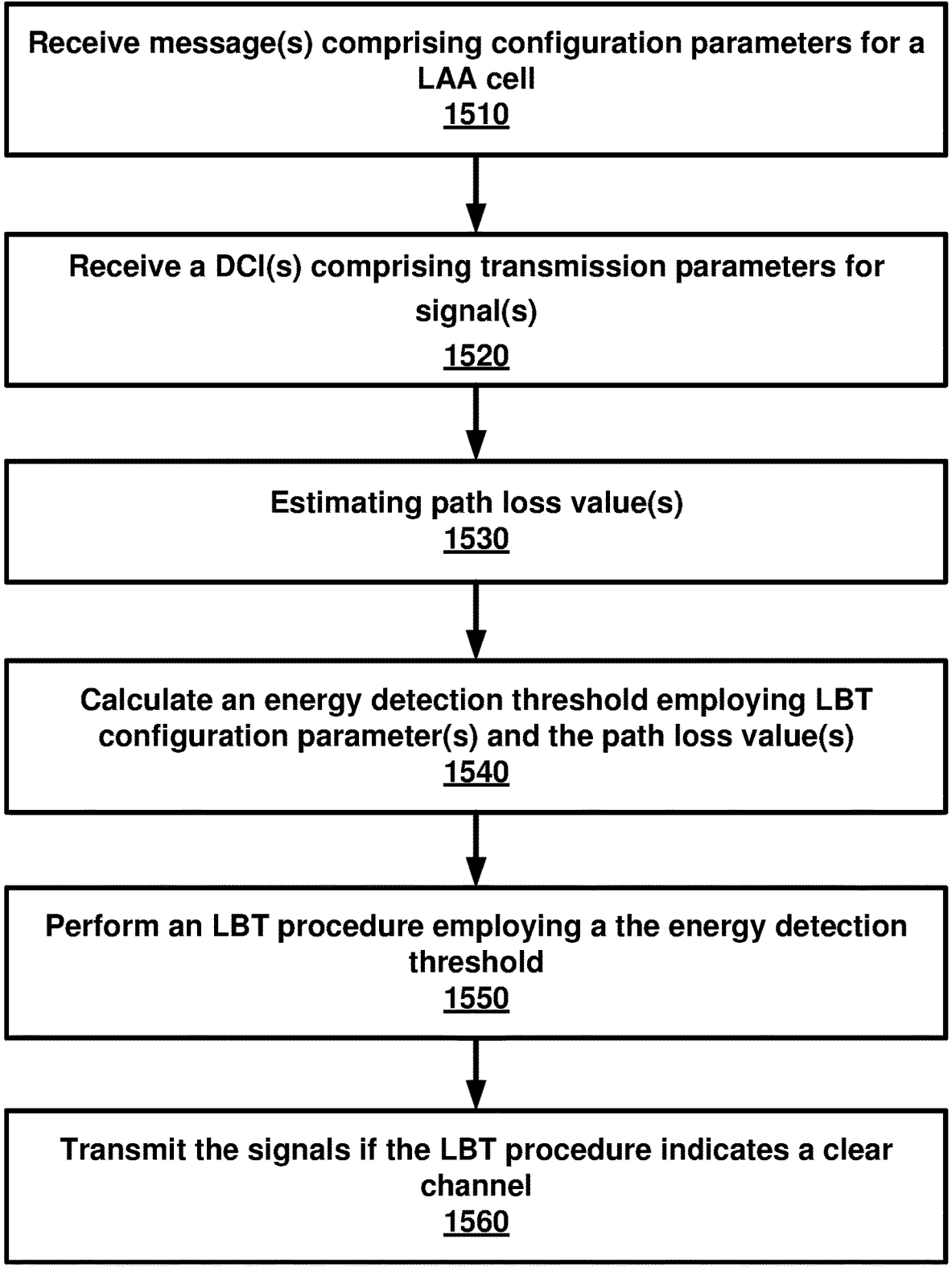
FIG. 15 is an example flow diagram as per an aspect of an embodiment of the present disclosure.

FIG. 15 is an example flow diagram as per an aspect of an embodiment of the present disclosure. At 1510, a wireless device may receive one or more messages. The one or more messages may comprise configuration parameters for a licensed assisted access (LAA) cell. The configuration parameters may comprise one or more listen before talk (LBT) configuration parameters for the LAA cell. At 1520, the wireless device may receive one or more downlink control information (DCI). The one or more DCI may comprise transmission parameters for one or more signals. At 1530, one or more path loss values may be estimated. At 1540, an energy detection threshold may be calculated employing the one or more LBT configuration parameters and the one or more path loss values. At 1550, an LBT procedure may be performed employing the energy detection threshold. At 1560, the wireless device may transmit the one or more signals if the LBT procedure indicates a clear channel.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving one or more messages comprising configuration parameters for a licensed assisted access (LAA) cell;
receiving one or more downlink control information (DCI) comprising:
transmission parameters for a plurality of consecutive signals, wherein each of the plurality of consecutive signals is for transmission via the LAA cell; and
one or more power control commands for the plurality of consecutive signals;
calculating a plurality of transmission powers for the plurality of consecutive signals for transmission via the LAA cell employing the one or more power control commands and a pathloss value for the LAA cell;
calculating a plurality of energy detection thresholds, each being based on a corresponding transmission power of the plurality of transmission powers for the plurality of consecutive signals for transmission via the LAA cell;
performing a listen before talk (LBT) procedure employing a minimum energy detection threshold of the plurality of calculated energy detection thresholds; and
transmitting, via the LAA cell, the plurality of consecutive signals if the LBT procedure indicates a clear channel.

2. The method of claim 1, wherein:
the configuration parameters comprise one or more LBT configuration parameters for the LAA cell; and
the calculating the energy detection threshold further employs the one or more LBT configuration parameters.

3. The method of claim 1, wherein the plurality of consecutive signals comprise one or more sounding reference signals (SRSs).

4. The method of claim 1, wherein the plurality of consecutive signals comprise one or more physical uplink control channels (PUCCHs).

5. The method of claim 1, wherein the calculating the energy detection threshold employs a maximum of the plurality of transmission powers for the plurality of consecutive signals.

6. The method of claim 1, wherein the calculating the energy detection threshold employs a first transmission power of a first signal in the plurality of consecutive signals.

7. The method of claim 1, wherein the calculating the energy detection threshold employs a maximum of:
a first transmission power of a first signal in the plurality of consecutive signals; and
a maximum of the plurality of transmission powers for the plurality of consecutive signals.

8. The method of claim 1, wherein the plurality of consecutive signals are transmitted in a subframe.

9. The method of claim 1, wherein the plurality of consecutive signals are transmitted in an uplink burst comprising a plurality of subframes.

10. The method of claim 1, wherein the one or more DCI comprise a multi-subframe grant.

11. A wireless device comprising:
one or more processors; and
memory storing instructions that, when executed by the one or more processors, cause the wireless device to:

receive one or more messages comprising configuration parameters for a licensed assisted access (LAA) cell;
receive one or more downlink control information (DCI) comprising:
 transmission parameters for a plurality of consecutive signals, wherein each of the plurality of consecutive signals is for transmission via the LAA cell; and
 one or more power control commands for the plurality of consecutive signals;
calculate a transmission powers for the plurality of consecutive signals for transmission via the LAA cell employing the one or more power control commands and a pathloss value for the LAA cell;
calculate a plurality of energy detection thresholds, each being based on a corresponding transmission power of the plurality of transmission powers for the plurality of consecutive signals for transmission via the LAA cell;
perform a listen before talk (LBT) procedure employing a minimum energy detection threshold of the plurality of calculated energy detection thresholds; and
transmitting the plurality of consecutive signals if the LBT procedure indicates a clear channel.

12. The wireless device of claim 11, wherein:
the configuration parameters comprise one or more LBT configuration parameters for the LAA cell; and
the instructions, when executed by the one or more processors, further cause the wireless device to calculate the energy detection threshold further employing the one or more LBT configuration parameters.

13. The wireless device of claim 11, wherein the plurality of consecutive signals comprise one or more sounding reference signals (SRSs).

14. The wireless device of claim 11, wherein the plurality of consecutive signals comprise one or more physical uplink control channels (PUCCHs).

15. The wireless device of claim 11, wherein the instructions, when executed by the one or more processors, further cause the wireless device to calculate the energy detection threshold employing a maximum of the plurality of transmission powers for the plurality of consecutive signals.

16. The wireless device of claim 11, wherein the instructions, when executed by the one or more processors, further cause the wireless device to calculate the energy detection threshold employing a first transmission power of a first signal in the plurality of consecutive signals.

17. The wireless device of claim 11, wherein the instructions, when executed by the one or more processors, further cause the wireless device to calculate the energy detection threshold employing a maximum of:
 a first transmission power of a first signal in the plurality of consecutive signals; and
 a maximum of the plurality of transmission powers for the plurality of consecutive signals.

18. The wireless device of claim 11, wherein the plurality of consecutive signals are transmitted in a subframe.

19. The wireless device of claim 11, wherein the plurality of consecutive signals are transmitted in an uplink burst comprising a plurality of subframes.

20. The wireless device of claim 11, wherein the one or more DCI comprise a multi-subframe grant.

* * * * *